US010050803B2

(12) United States Patent
Fischer

(10) Patent No.: US 10,050,803 B2
(45) Date of Patent: Aug. 14, 2018

(54) METHOD FOR PROVIDING USB POWER OVER ETHERNET

(71) Applicant: FSR Inc., Woodland Park, NJ (US)

(72) Inventor: Joseph W. Fischer, Pequannock, NJ (US)

(73) Assignee: FSR, Inc., Woodland Park, NJ (US)

(*) Notice: Subject to any disclaimer, the term of this patent is extended or adjusted under 35 U.S.C. 154(b) by 0 days.

(21) Appl. No.: 15/662,412

(22) Filed: Jul. 28, 2017

(65) Prior Publication Data
US 2017/0331638 A1 Nov. 16, 2017

Related U.S. Application Data

(62) Division of application No. 13/469,748, filed on May 11, 2012, now Pat. No. 9,755,852.

(51) Int. Cl.
G06F 1/26 (2006.01)
H04L 12/413 (2006.01)
H02J 7/00 (2006.01)

(52) U.S. Cl.
CPC .............. H04L 12/413 (2013.01); G06F 1/26 (2013.01); H02J 2007/0062 (2013.01)

(58) Field of Classification Search
CPC ........ H04L 12/413; H04L 12/66; H04M 1/00; H02J 2007/0062; G06F 1/00; G06F 1/26; G06F 15/16
See application file for complete search history.

(56) References Cited

U.S. PATENT DOCUMENTS

| 7,343,506 | B1* | 3/2008 | Fenwick | G06F 1/26 |
| | | | | 713/310 |
| 9,690,732 | B2* | 6/2017 | Balasubramanian | G06F 13/387 |
| 9,760,517 | B2* | 9/2017 | Liston | G06F 13/387 |
| 2005/0172139 | A1* | 8/2005 | Kanai | G06F 13/385 |
| | | | | 713/189 |
| 2007/0121832 | A1* | 5/2007 | Ghoshal | H04L 12/10 |
| | | | | 379/93.36 |
| 2010/0049994 | A1* | 2/2010 | Ghoshal | G06F 1/26 |
| | | | | 713/300 |
| 2011/0116556 | A1* | 5/2011 | Towers | H04W 52/0261 |
| | | | | 375/259 |
| 2016/0370835 | A1* | 12/2016 | Erickson | G06F 1/266 |
| 2017/0351309 | A1* | 12/2017 | Hartnett | G06F 1/26 |

* cited by examiner

Primary Examiner — Matthew Nguyen
(74) Attorney, Agent, or Firm — Florek & Endres PLLC

(57) ABSTRACT

A method for providing USB power including the steps of running a POE cable from a power source to an adapter, the adapter having a POE connector for receiving electrical power from the power lines of the POE cable, a transformer circuit and a USB connector where the data lines of the POE cable terminate prior to the data lines reaching the USB connector and the power lines of the POE cable provide power to the USB powered device, adapting the POE power from the POE cable to USB power and making the USB power available to the USB connector.

12 Claims, 4 Drawing Sheets

METHOD FOR PROVIDING USB POWER OVER ETHERNET

FIELD OF THE INVENTION

The present invention relates to electrical powered systems, standards and devices. More particularly, the present invention relates to devices and methods for adapting power from Power Over Ethernet (POE) lines to universal serial bus (USB) power.

BACKGROUND OF THE INVENTION

USB standard technology was developed as a bus for connection between computers and electronic devices. The USB connection was designed to provide both communication and a power supply. Since its introduction, however, USB has evolved to replace a variety of computer interfaces, such as serial and parallel ports. USB has also evolved for use as a separate power charger for portable devices. With respect to the electrical power related to USB, the USB standard defines an electrical signal of 5 volt DC, with a maximum voltage of 5 V (±5%).

Many consumer products including, for example, I-pads, cell phones, PDA's, etc. ("USB powered devices"), derive their operating/battery recharge power from the (nominal) 5 volt DC power available on a computer USB port. AC wall mount charging adapters, which also utilize the USB connector as the connection point for the power supply, have become popular to recharge these USB powered devices when a computer USB port is not available. Such adapters generally include an AC power plug and a USB port or wire to a USB or other universal connector, such as an Apple dock connector. Of course, when referring to USB connectors, it is understood that there are many different types of USB connectors, including Type A, Type B, Mini-A, Mini-B, Micro-A, Micro-B, Apple dock connectors, etc., all of which are intended to be covered herein.

There are also retail, commercial and other applications requiring the fixed or semi-permanent mounting of USB powered devices. For example, stores often provide tablets such as iPads for an employee to search, provide customer information and/or order from one or more fixed locations in a retail establishment. In such applications, the USB powered devices are typically powered from an AC power adapter, requiring that an AC receptacle be installed at each location at a cost of several hundred dollars.

Similarly, USB "Charging Stations" are provided for convenience in many public areas, such as airports and conference facilities. These charging stations are provided to allow charging of USB powered devices when traveling. Such charging stations are also typically powered from an AC line which requires a receptacle and costly line power connection.

Power over Ethernet, or POE, technology describes a system for passing electrical power safely along with data on Ethernet lines or cables. Power is supplied in common mode over one of two designated differential pairs of wires in the Ethernet cables, originating from a power supply within a POE enabled network. The original IEEE 802.3af-2003 POE standard provided up to 15.4 watts of DC power to each device, however, the updated IEEE 802.3at-2009 POE standard provides up to 25.5 watts of power. The voltage range available with POE is from about 37 to about 57 volts.

POE technology is considered especially useful for powering certain devices which require more power than USB offers and when longer runs of cable are required than USB permits. In this regard, Category 5 POE cable and power radios and other low power devices through over 100 meters of cable, an order of magnitude farther than the theoretical maximum of USB.

Moreover, POE cable is considered to be easy to run and is readily available in most commercial spaces. Due to the low DC voltage of POE compared to standard AC power supply, the installation of a POE cable drop does not require an electrician. Therefore, bringing low DC voltage POE power to locations fairly remote from a power supply via POE cable has been shown to be cost effective.

Notwithstanding the above, there is a need for providing USB power from remote power supplies over relatively long distances, when considering USB power, in an efficient and cost effective manner.

SUMMARY OF THE INVENTION

It has been discovered that USB powered devices can be powered from a USB connector, commonly a type A receptacle, which is powered by POE cable. In keeping, the present invention is directed to a power adapter comprising a POE power line connector for receiving electrical power from the power lines of a POE cable, a transformer circuit and a USB power line connector for delivering electrical power to a USB powered device, wherein a POE power line provides power to the USB powered device.

In a preferred embodiment, the POE power line connector comprises an Ethernet jack, or receptacle, which can receive a standard POE, or Ethernet, plug. Notwithstanding, it is understood that the POE connector can comprise any type of electrical connection to the power adapter, such as spring contacts, screw down contacts, push-in contacts, stripped wires, etc., that establish an electrical connection between the POE cable power source and the power adapter. It is also understood that the only lines of the POE cable that are necessary are the lines providing power. Therefore, when referring to POE cable herein, it is only intended that such POE cable include the dedicated power lines of POE cable. Of course, absent the manufacture of POE cable with only dedicated power lines, standard POE cable is well suited to practice the invention.

Similarly, the USB power line connector in the preferred embodiment is a USB type A receptacle for receiving a USB type A plug, however, can be any type of electrical connection to the USB powered device. For example, the USB power line connector may be a Type A, Type B, Mini-A, Mini-B, Micro-A, Micro-B, Apple dock connector or other plug that can be inserted directly into the USB powered device or other contacts, as described above with respect to the POE connector. Additionally, depending on the power available from the POE cable, more than one USB connector or line can be associated with a single POE line.

Between the POE power line connector and the USB power line connector is the transformer circuit which converts the POE power, most commonly 48 volt POE power under the current standard, to 5 V DC USB power. As set out above, more than one USB power line connector may be associated with a single POE power line if the POE power line has sufficient power.

Conversion of the POE power to USB power can be accomplished by any number of circuit designs. A preferred circuit would include inductors to present the proper impedance to Ethernet data pairs while extracting the POE DC voltage at center-tap connections. The POE DC voltage available at either the data or spare pairs of the network drop may then be rectified. Filtering and HF suppression of the raw DC is preferably provided and associated circuitry comprises the switching regulator circuitry that converts the POE DC voltage to an isolated, regulated 5 V DC supply. Isolated feedback for the regulator is preferably provided and associated components and circuitry would provide the physical connection to the USB bus while presenting the appropriate USB data line biasing to support USB devices as well as a dedicated charging port mode.

The power adaptor of the present invention can take a variety of forms, all intended to be covered in this application. For example, the power adapter can take the form of a self-contained encased device that can be carried by a user having a POE receptacle and a USB receptacle. A user can then plug a POE cable extension with an Ethernet jack into the POE receptacle and a USB powered device's charger cable into the USB receptacle. Alternatively, the power adapter can have a POE power line connector in the form of an Ethernet jack or plug on a wire extending from the power adaptor for the user to plug into an existing Ethernet receptacle found in virtually every office. Similarly, the USB power line connector can be in the form of a USB plug, taken from the variety of USB plugs available, on the adapter or on a wire extending from the power adapter, such that the power adapter can take the form of a portable adapter or a desktop dock.

The power adapter can also take the form of a component for permanent mounting in an AC electrical box using one or more mounting screws, clips or the like to fix the power adapter in the AC electrical box. In this embodiment, the power adapter preferably has the POE power line connector on an area that is only accessible from within the AC electrical box and a USB receptacle on the portion accessible to users on the exterior of the AC electrical box. The invention further contemplates use of the AC electrical box mounted power adapter used in combination with or elements to mount a USB powered device such as a tablet computer to the same AC electrical box, thereby eliminating all exposed wiring and providing a clean installation.

Also part of this invention is the method for providing USB power to a remote location comprising the steps of running a POE cable from a power source to a remote power adapter, transforming the POE power from the POE cable to USB power, and making the USB power available to a USB powered device.

BRIEF DESCRIPTION OF THE DRAWINGS

The attached drawings are intended to better illustrate a preferred embodiment of the present invention without limiting the invention in any manner whatsoever.

DETAILED DESCRIPTION OF THE PREFERRED EMBODIMENTS

The following description of preferred embodiments is presented to describe the present invention and is not to be construed to limit the scope of the appended claims in any manner whatsoever.

Figure 1:
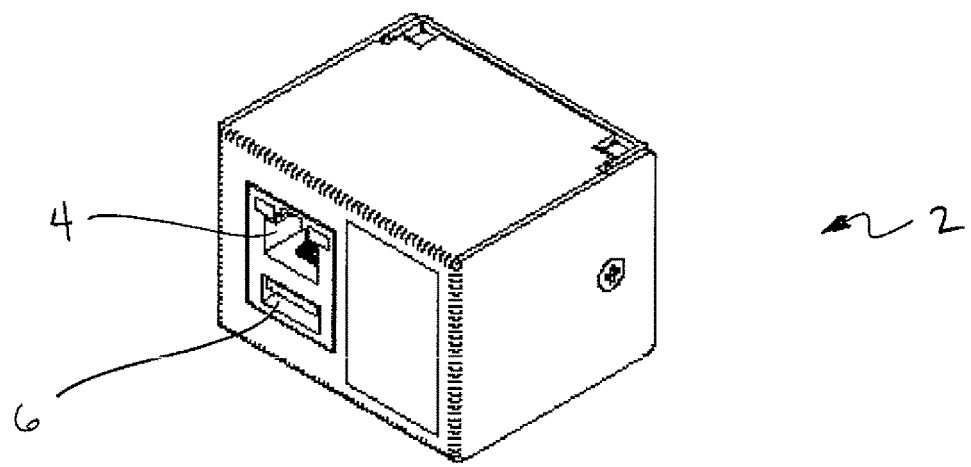
FIG. 1 is a perspective view of a portable POE to USB power adapter according to the present invention.
Figure 2:
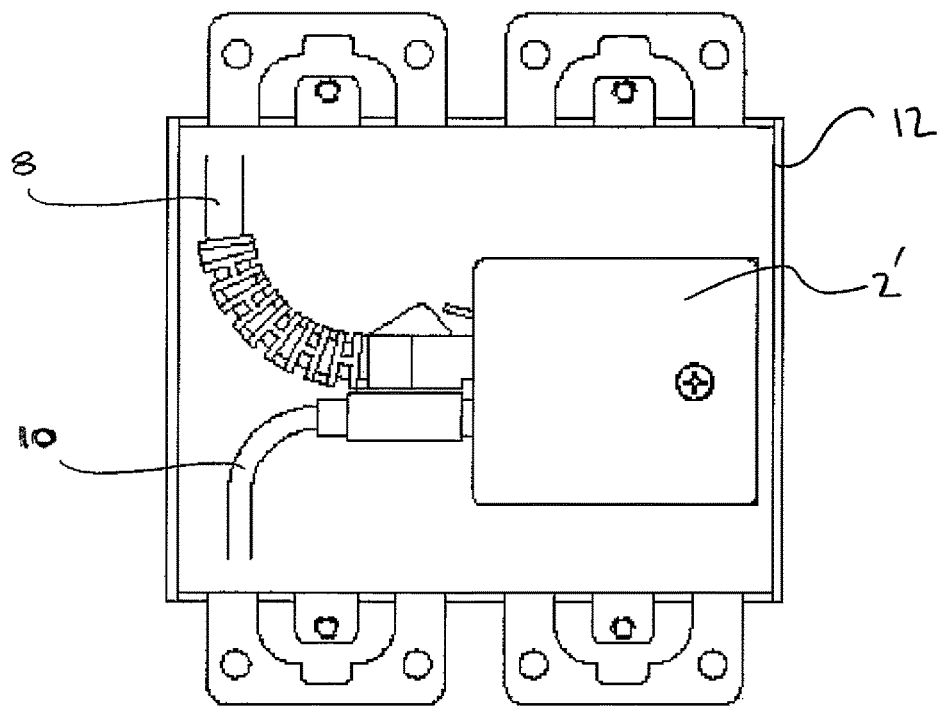
FIG. 2 is an elevation of a POE to USB power adapter according to the present invention, mounted in a standard two-gang AC electrical box, with POE and USB cables connected.

The present invention is shown in FIGS. 1 and 2 in the form of a power adapter 2 comprising a POE power line connector 4 for receiving electrical power from the power lines of a POE cable, a transformer circuit and a USB power line connector 6 for delivering electrical power to a USB powered device (not shown), wherein power from a POE cable 8 provides power to a USB powered device through a USB cable 10.

As shown in FIG. 1, the preferred power adapter 2 of the present invention can take the form of a portable device that can be carried by a user to power a USB powered device when away from a computer or AC outlet. In this embodiment, the POE power line connector 2 is preferably a standard Ethernet connector into which a POE cable can be plugged. A user could carry a short "jumper" cable to plug into an Ethernet jack found on most office walls to provide USB power at the USB connector 6. Similarly, the user would be expected to carry a USB cable to connect a USB powered device to the power adapter 2 in this embodiment.

Of course, the invention contemplates the POE connector 4 and/or USB connector 6 being any suitable form to conduct the necessary POE and/or USB power. Of these, the most preferred would be a POE cable hard wired to the transformer circuit with an Ethernet jack or plug at the terminal end for plugging into an POE receptacle. Likewise, a USB cable could be hardwired to the transformer circuit with a USB jack or plug at the terminal end, however, this is less preferred than on the POE end since there are many more types of jacks for receiving USB power. Therefore to use this arrangement for the USB connector would require a dedicated power adapter 2 dedicated to the specific USB receptacle on a particular type of USB powered device.

As shown in FIG. 2, it is contemplated that the power adapter 2 of the present invention can be mounted in a standard AC electrical box 12. The power adapter 2 is shown mounted in a transverse configuration in a standard two (2) gang AC electrical box 12. This permits the use of the power adapter 2 with a cover plate that fully encloses the power adapter and its wiring, such as the cover plate 14 shown in FIG. 3 which is fashioned to mount a USB powered device in the form of a tablet computer, such as an iPad® or the like, directly over the AC electrical box 12. As set forth above, this is especially convenient for commercial and retail operations which have internal Wi-Fi and use tablet computers for customer service or the like.

Figure 4:
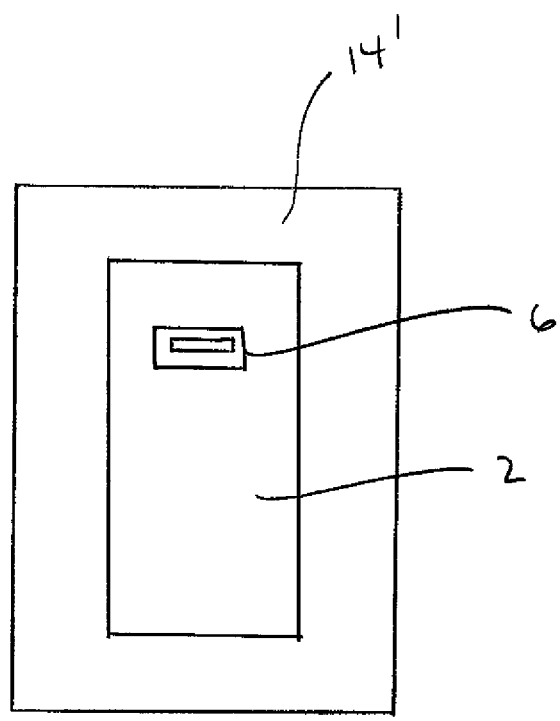
FIG. 4 is an elevation of a POE to USB power adapter mounted in an AC electrical box behind a cover plate with the USB connector exposed.

Notwithstanding, it is also contemplated that the power adapter 2 of the present invention be configured to be mounted, for example, within one gang of an AC electrical box 12 where the POE connector is not accessible on the exterior of the AC electrical box 12, but one or more USB connectors are accessible on the exterior of the AC electrical box 12. In such an embodiment, shown in FIG. 4, a cover plate, such as a standard cover plate with a rectangular opening or modular cover plate having square openings for any of a variety of Ethernet jacks, telephone jacks, cable jacks, etc., can be used to mount an exposed USB connector 6. This embodiment is well suited for use with charging stations in public facilities such as airports, conference facilities, restaurants or café s, etc., where the USB connector 6 of the power adapter 2 is made available for public users to charge USB powered devices.

Figure 3:
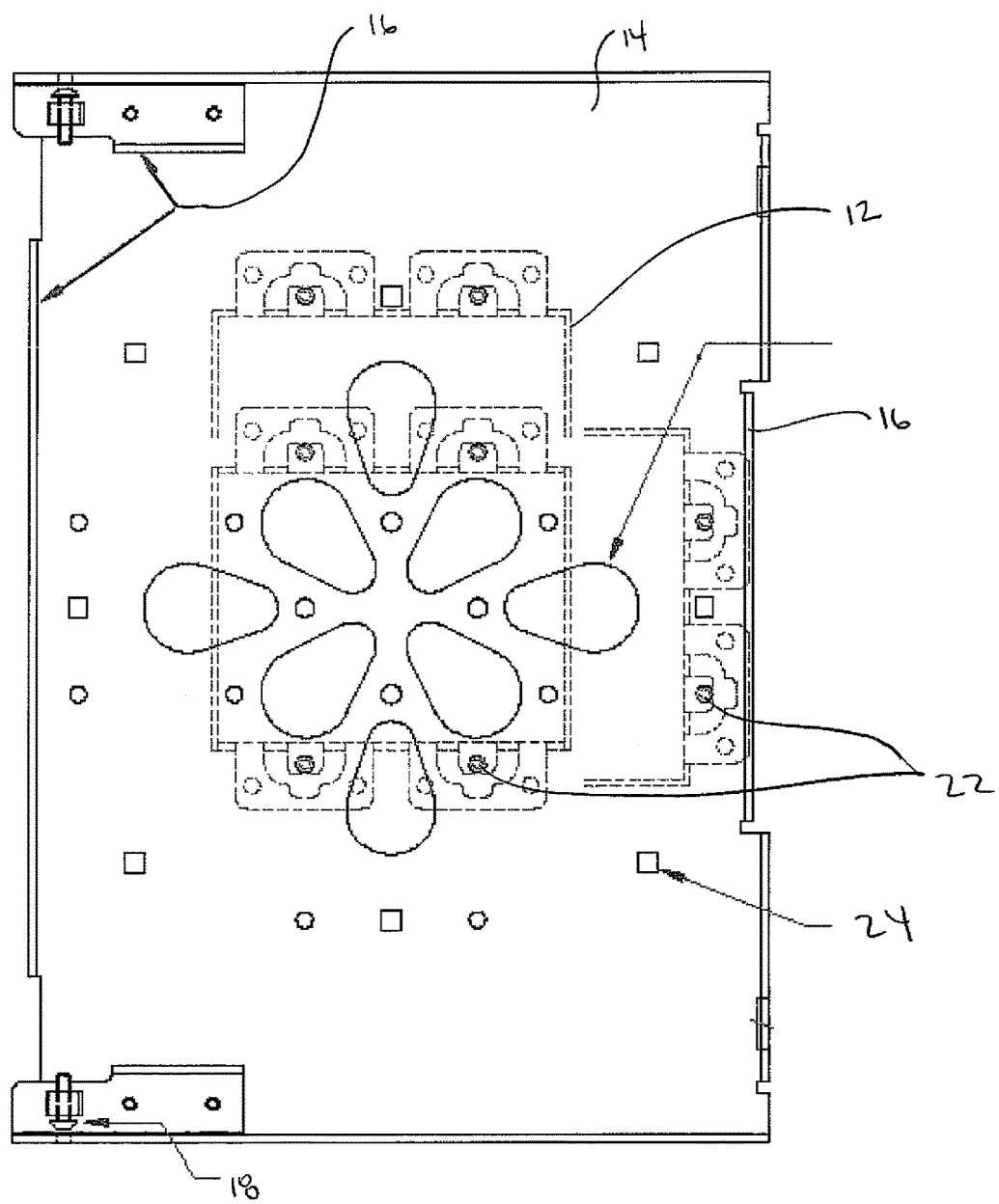
FIG. 3 is an elevation of a prior art tablet computer mounting device used for mounting a tablet computer over an AC electrical box.

With specific reference to the embodiment having a power adapter 2 in combination with a cover plate for mounting a dedicated USB powered device, such as a tablet computer, as shown in FIG. 3, it is most preferred that the cover plate 14 include mounting elements and openings for ease of connection between the power adapter 2 and the device. In this regard, the mounting elements preferably include edge capture flanges 16 that extend over the edge of the dedicated device without significantly obstructing the screen, and cover locking security screws 18, or other locking means, to prevent theft of the device.

The preferred dedicated cover plate also includes wire pass through holes 20 positioned on the cover plate 14 for the USB wire to pass through to the power adapter 2. Preferably, these wire pass through holes 20 are distributed about the cover plate 14 to not only provide options for passing the USB wire through the cover plate 14, but also to aid in heat distribution on the back of the device. AC electrical box mounting holes 22 are preferably positioned to secure the cover plate directly to the AC electrical box 12, using treaded openings on the AC electrical box itself. These AC electrical box mounting holes 22 are preferably placed on the interior portion of the cover plate 14 so that mounting screws passing through them are not accessible when the device is secured to the cover plate 14. Additionally, for more secure mounting, stud mounting holes 24 are included to screw the cover plate 14 directly into a wall stud, providing not only security from theft but a firm mounting of the device.

With respect to adapting the POE power to USB power, it is understood that any suitable transformer circuit can be used and that a variety of alternatives will make themselves apparent to those skilled in the electrical art. Notwithstanding, a preferred a transformer circuit is shown in FIG. 5.

Figure 5:
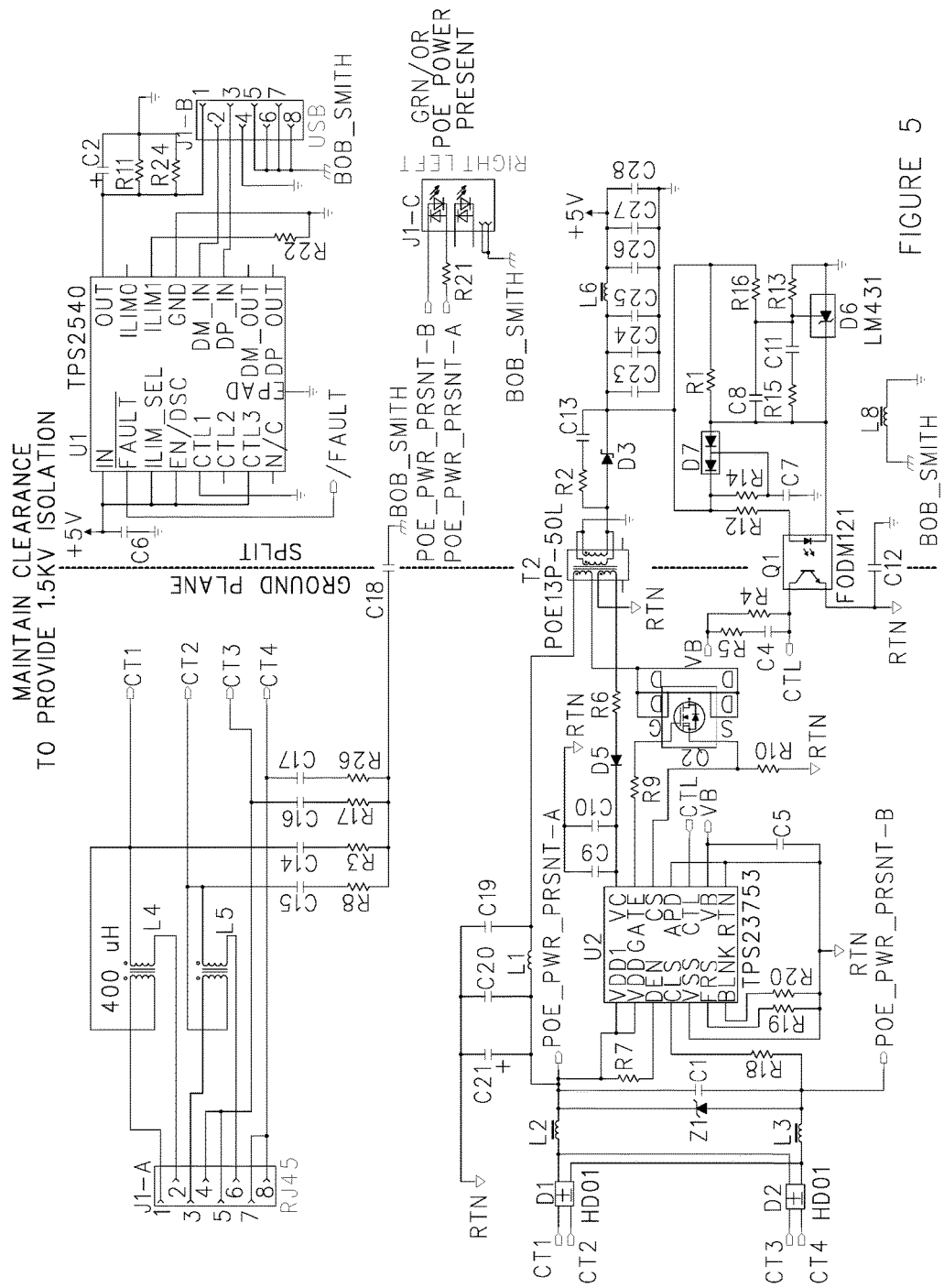
FIG. 5 is a basic schematic of a preferred method of adapting POE power to USB power for use in the present invention.

As shown in the preferred circuit of FIG. 5, inductors L4 and L5 present the proper impedance to Ethernet data pairs 1+2, and 3+6 while extracting the POE DC voltage at their center-tap connections. The POE DC voltage available at either the data or spare pairs of the network drop is rectified by D1 and D2. Filtering and HF suppression of the raw DC is provided by L2, L3, C1, C21, C20, Z1, L1, and C19, U2, T2, Q2 and associated circuitry comprise the switching regulator circuitry that converts the POE DC voltage to an isolated, regulated 5 V DC supply. Isolated feedback for the regulator is provided by optoisolator Q1, D6 and associated components U1, J1B and associated circuitry provides the physical connection to the USB bus while presenting the appropriate USB data line biasing to support USB devices, preferably including Apple devices, as well as a dedicated charging port mode.

Also part of this invention is the method for providing USB power to a remote location comprising the steps of running a POE cable from a power source to a remote power adapter, transforming the POE power from the POE cable to USB power, and making the USB power available to a USB powered device. Using the preferred embodiment of the present invention described above, additional steps of mounting an AC electrical box at the remote location, mounting the power adapter in the AC electrical box and mounting a cover plate over the AC electrical box are contemplated. The method of the present invention also preferably includes plugging an Ethernet plug on a POE cable with POE power into the POE connector of the power adapter.

Variations, modifications and alterations to the preferred embodiment of the present invention described above will make themselves apparent to those skilled in the art. All such changes are intended to fall within the spirit and scope of the present invention, limited solely by the appended claims.

The invention claimed is:

1. A method for providing USB power at a location remote from a power supply comprising the steps of:
    a. running a POE cable having one or more power lines and one or more data lines from a power source to a power adapter, the power adapter comprising a POE connector for receiving electrical power from the power lines of the POE cable, a transformer circuit and a USB connector, and a termination point in the data lines of the POE cable prior to the data lines reaching the USB connector, leaving only the power lines of the POE cable to connect with and provide power to the USB powered device;
    b. transforming the POE power from the POE cable to USB power; and
    c. making the USB power available to the USB connector.

2. The method of claim 1 further comprising mounting an AC electrical box in the location remote from the power supply.

3. The method of claim 2 further comprising mounting the power adapter within the AC electrical box.

4. The method of Claim 2 further comprising mounting a cover plate on the AC electrical box.

5. The method of claim 1 wherein one or more USB connectors are associated with a single POE cable.

6. The method of claim 3 wherein the POE connector is positioned to accept a POE cable internal to the AC electrical box and the USB connector is positioned to be accessed external to the AC electrical box.

7. The method of claim 1 wherein the POE connector is taken from the group consisting of an Ethernet receptacle, spring contacts, screw down contacts, push-in contacts and stripped wires.

8. The method of claim 7 wherein the POE connector is an Ethernet receptacle.

9. The method of claim 1 wherein the USB connector is taken from the group consisting of USB Type A, USB Type B, USB Mini-A, USB Mini-B, USB Micro-A, USB Micro-B, Apple dock connector, spring contacts, screw down contacts, push-in contacts and stripped wires.

10. The method of claim 9 wherein the USB connector is a USB Type A receptacle.

11. The method of claim 1 wherein one or more USB connectors are associated with a single POE power cable.

12. The method of claim 1 wherein the power adapter is a self-contained device in a case.

* * * * *